(12) United States Patent
Wu

(10) Patent No.: US 10,250,303 B2
(45) Date of Patent: Apr. 2, 2019

(54) SYSTEM AND SELECTING METHOD FOR FLEXIBLE ALLOCATIONS OF ANTENNA SUB-ARRAYS IN MULTIPLE INPUT MULTIPLE OUTPUT SYSTEMS

(71) Applicants: National Taiwan University, Taipei (TW); MediaTek Inc., Hsinchu (TW)

(72) Inventor: Sau-Hsuan Wu, Hsinchu (TW)

(73) Assignees: NATIONAL TAIWAN UNIVERSITY, Taipei (TW); MEDIATEK INC., Hsinchu (TW)

(*) Notice: Subject to any disclaimer, the term of this patent is extended or adjusted under 35 U.S.C. 154(b) by 2 days.

(21) Appl. No.: 15/592,865

(22) Filed: May 11, 2017

(65) Prior Publication Data

US 2017/0331531 A1  Nov. 16, 2017

Related U.S. Application Data

(60) Provisional application No. 62/335,185, filed on May 12, 2016.

(51) Int. Cl.
| | |
|---|---|
| H04B 7/02 | (2018.01) |
| H04L 1/02 | (2006.01) |
| H04B 7/0417 | (2017.01) |
| H04B 7/06 | (2006.01) |
| H04B 7/08 | (2006.01) |

(Continued)

(52) U.S. Cl.
CPC ......... H04B 7/0417 (2013.01); H04B 7/0469 (2013.01); H04B 7/0617 (2013.01); H04B 7/0626 (2013.01); H04B 7/086 (2013.01); H04L 25/0208 (2013.01); H04L 25/03343 (2013.01);

(Continued)

(58) Field of Classification Search
CPC .................................................. H04B 7/0413
See application file for complete search history.

(56) References Cited

U.S. PATENT DOCUMENTS

| | | | |
|---|---|---|---|
| 6,324,212 B1 * | 11/2001 | Jenness | H04L 5/023 370/465 |
| 6,404,774 B1 * | 6/2002 | Jenness | H04L 5/023 370/465 |

(Continued)

*Primary Examiner* — Shuwang Liu
*Assistant Examiner* — Gina McKie
(74) *Attorney, Agent, or Firm* — Muncy, Geissler, Olds & Lowe, P.C.

(57) ABSTRACT

The invention provides a selection circuit and method of multiple input/output ports and antenna sub-arrays for reconfigurable hybrid beamforming. The selection circuit includes a plurality of digital signal processing modules, each electrically connected to a respective input/output port, a plurality of analog front end (AFE) and radio frequency (RF) chains, each electrically connected to a respective digital signal processing module, a plurality of multiplexing circuits, each electrically connected to any number of the AFE and RF chains, and a plurality of antenna sub-arrays, each electrically connected to a respective multiplexing circuit, wherein the multiplexing circuits set any number of the antenna sub-arrays to transmit/receive any number of electrical signals of input/output ports transmitted by the AFE and RF chains. The invention further provides a signal processing and transmission/reception system and a combination selection method of multiple input/output ports and antenna sub-arrays based on the selection circuit.

7 Claims, 11 Drawing Sheets
(5 of 11 Drawing Sheet(s) Filed in Color)

(51) Int. Cl.
*H04L 27/00* (2006.01)
*H04B 7/0456* (2017.01)
*H04L 25/02* (2006.01)
*H04L 25/03* (2006.01)

(52) U.S. Cl.
CPC .... *H04L 25/03898* (2013.01); *H04L 27/0002* (2013.01)

(56) References Cited

U.S. PATENT DOCUMENTS

2011/0216846 A1\* 9/2011 Lee ............... H04B 7/0473
  375/295
2014/0045478 A1\* 2/2014 Moshfeghi ............ H04W 84/00
  455/418

\* cited by examiner

SYSTEM AND SELECTING METHOD FOR FLEXIBLE ALLOCATIONS OF ANTENNA SUB-ARRAYS IN MULTIPLE INPUT MULTIPLE OUTPUT SYSTEMS

CROSS-REFERENCE TO RELATED APPLICATIONS

This Non-provisional application claims priority under 35 U.S.C. § 119(a) on Patent Application No. 62/335,185 filed in US May 12, 2016, the entire contents of which are hereby incorporated by reference.

FIELD OF THE INVENTION

The present invention relates to a selection circuit and method of multiple input/output ports and antenna sub-arrays for reconfigurable hybrid beamforming. More particularly, the selection circuit of the present invention performs signal transmission between the transmission end and the reception end of multiple input multiple output (MIMO) system and finds a preferable multiple input/output port and antenna sub-array combination configuration.

BACKGROUND OF THE INVENTION

In millimeter wave (mmWave) radio channels, a wide and continuous frequency bandwidth can be available, so that the data transmission rate in this frequency band can be substantially increased. Nevertheless, transmissions in the mmWave radio channel may suffer from serious power path losses. The transmission range of the mmWave signal is usually shorter than the transmission range of the microwave signal. As such, the mmWave signal would have a relatively higher spatial reuse factor. Considering the characteristics of the mmWave channel and the shorter wavelength of the mmWave radio band, a large antenna array can be used to enhance the signal intensity and directivity in specific spatial directions with the array's beamforming gain, or to improve the reliability of signal transmission or channel capacity with the array's spatial diversity or multiplexing gains.

However, in an mmWave radio system, the antennas are in close proximity to each other, due to the short wavelength. Thus, signals transmitted or received by the antennas would have strong spatial correlations, thus reducing the spatial diversity. Further, when a digital beamforming architecture or a precoding technique is applied to the large antenna arrays of a mmWave radio system, the beamformer itself may result in problems of high cost and high power consumption. For example, according to previous researches, power consumption of an analog to digital converter (ADC) with a sampling rate of 500 Hz is between 200 mW and 350 mW. Thus, full digital beamforming with the uses of DAC/ADC will dramatically increase the power consumption and cost of the beamforming architecture. Moreover, the channel capacity gain may not increase proportionately with the number of antennas. Therefore, a hybrid beamforming (HBF) method has become increasingly popular.

Regarding the hybrid beamforming method, it refers to an architecture and method where the beamforming processes can be simultaneously performed at the baseband end and the radio frequency end respectively. Two HBF architectures are often used, which are referred to as the partially connected hybrid beamforming architecture shown in FIG. 1a and the fully connected hybrid beamforming architecture shown in FIG. 1b.

As shown in FIG. 1a, each radio frequency antenna is connected with a corresponding phase shifter. Each radio frequency antenna can only receive or transmit signals from a fixed analog front end (AFE) and radio frequency (RF) chain.

As shown in FIG. 1b, each radio frequency antenna is connected with multiple phase shifters for receiving or transmitting signals from each AFE-and-RF chain. Theoretically, the fully connected hybrid beamforming architecture provides better signal performance than the partially connected hybrid beamforming architecture.

In short, signals of each AFE-RF chain of the fully connected hybrid beamforming architecture ideally have narrower beams and better array gains. In contrast, the partially connected hybrid beamforming architecture has the advantage of a lower cost, while also have the disadvantage of wider beams and lower array gains. Given the fact that the mmWave radio channel has strong spatial correlations, there is no need to enable all AFE-RF chains at all time, and not all AFE-RF chains require the beam with the narrowest beam width and the highest-gain. Thus, the prior art has to be improved.

SUMMARY OF THE INVENTION

The present invention discloses a selection circuit of multiple input/output ports and antenna sub-arrays combination, comprising: a plurality of digital signal processing modules, each is electrically connected to a respective input/output port; a plurality of analog front end (AFE) and radio frequency (RF) chains, each electrically connected to a respective digital signal processing module; a plurality of multiplexing circuits, each is electrically connected to any number of the AFE and RF chains; and a plurality of antenna sub-arrays, each is electrically connected to one of respective multiplexing circuits. The multiplexing circuits set any number of the antenna sub-arrays to transmit/receive any number of input/output electrical signals of the AFE and RF chains.

Wherein antenna sub-arrays comprise: a plurality of phase shifters, each is electrically connected to a respective multiplexing circuit; a plurality of power amplifiers, each is electrically connected to a respective phase shifter; and a plurality of antenna ends, each is electrically connected to a respective power amplifier.

The present invention further discloses a signal processing and transmission/reception system, comprising: a transmission end, with a precoder, for encoding a data signal by using a signal processing method to output a plurality of first electrical signals; and a first selection circuit of multiple input ports and antenna sub-arrays according to above description, inputting the plurality of first electrical signals into an input port, and processing with a antenna sub-array combination.

And a reception end, comprising: a second selection circuit of multiple output ports and antenna sub-arrays according to above description, for receiving the wireless signal by a receiving antenna sub-array combination from an output port, and generating a plurality of second electrical signals; and an equalizer, for combing the plurality of second electrical signals by using a signal processing method and outputting the data signal.

The present invention further discloses a selection method of multiple input/output ports and antenna sub-arrays combination, is applied in a signal processing and transmission/reception system according to above description, the method comprising: (a) the system enabling a first multiple input/ output port and antenna sub-array combination, and transmitting a test signal via a transmission end, a reception end replies channel state information (CSI) to the transmission end after receiving the test signal, wherein the channel state information corresponds to channel statistic information of spatial and frequency generated by the first multiple input/output port and antenna sub-array combination.

(b) the transmission end designing a first procoder(w) according to the channel state information and estimating a first reception channel capacity (C).

(c) determining a relationship between eigenvalues of the first procoder(w) and a first multiple input/output port antenna sub-array combination, and the first reception channel capacity (C), providing a second multiple input/output port and antenna sub-array combination.

And (d) generating a second test signals corresponding to the antenna sub-array combination by encoding and arranging eigenvalues of the precoder and the first reception channel capacity.

Therefore, the selection circuit of multiple input/output ports and antenna sub-arrays has the advantages of feasibility, high power efficiency low complexity of the partially connected hybrid beamforming architecture and the advantage of high directivity of the fully connected hybrid beamforming architecture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention relates to a multiple-input multiple-output (MIMO) technology. The MIMO technology adopts multiple antennas at the transmitting end or the receiving end for improving transmission efficiency.

The MIMO technology may increase system throughput and transmission reliability without increasing the required bandwidth and output power. In a MIMO system, the transmission energy can be distributed to different antennas for transmission signal, it can enhance the spectrum efficiency (bits per second per hertz). Moreover, the same signal can be received via different channels simultaneously in the MIMO system, thus reducing the channel fading effect.

Figure 1A:
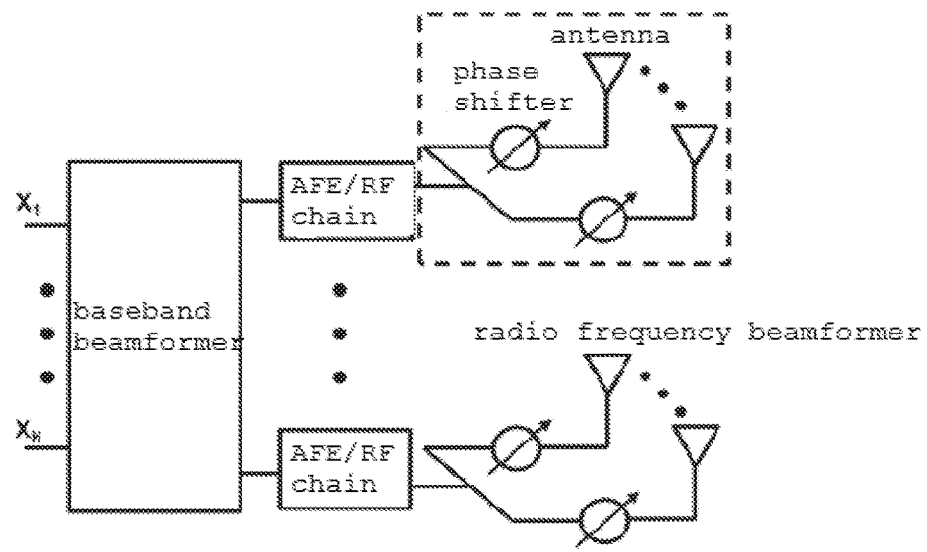
FIG. 1a is the schematic diagram of a conventional partially connected hybrid beamforming architecture.
Figure 1B:
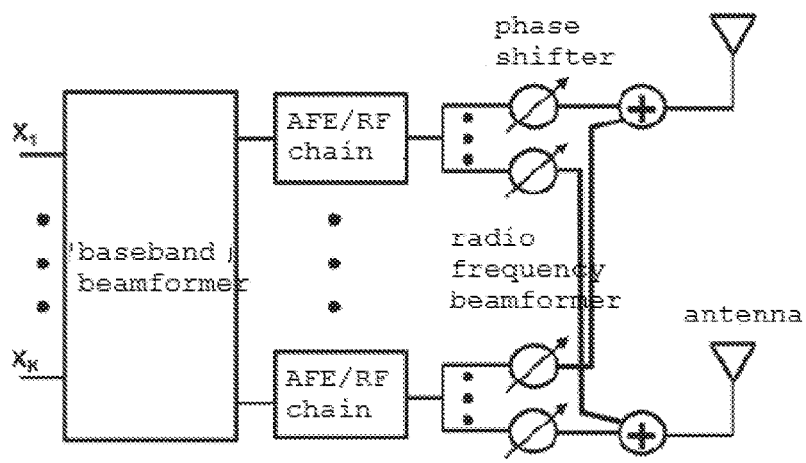
FIG. 1b is the schematic diagram of a conventional fully connected hybrid beamforming architecture.
Figure 2:
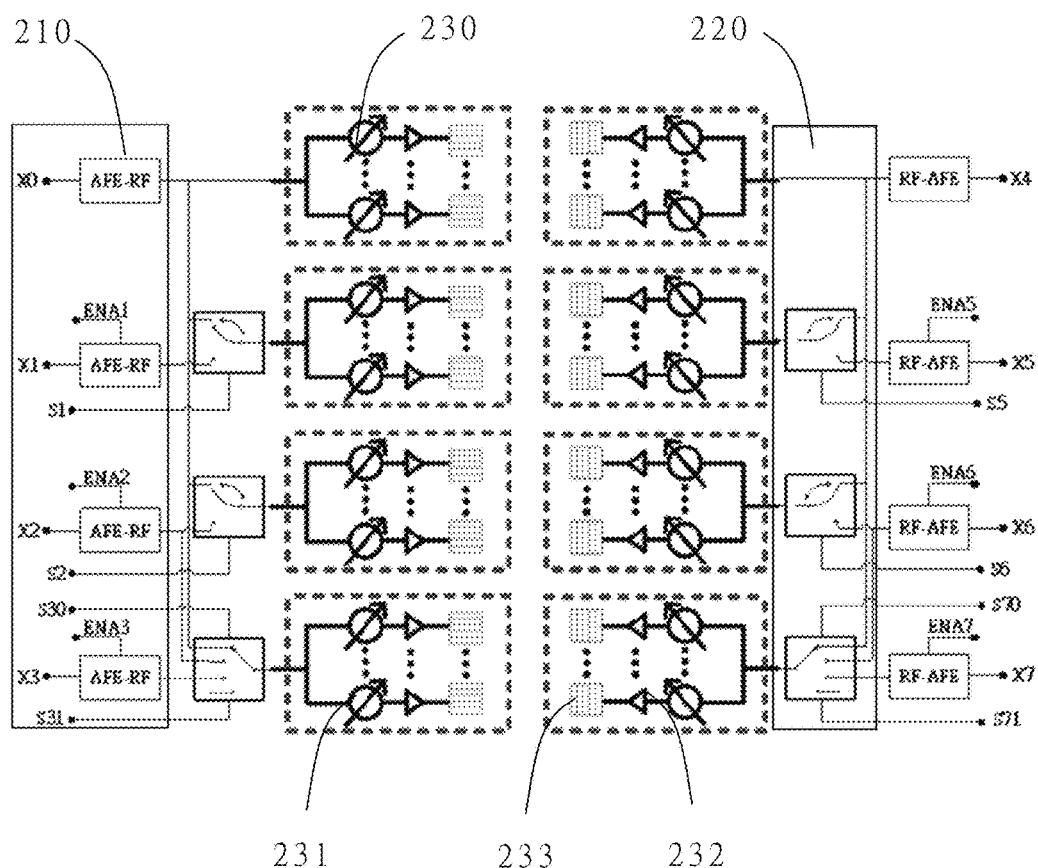
FIG. 2 is a schematic diagram of a selection circuit between AFE and RF chains and antenna sub-arrays according to an embodiment of the present invention.

Precoding is one of the practical techniques for the MIMO system. Precoding is a multi-stream beamforming technique. Beamforming is a signal processing technique, which processes signals with matrix operation before transmitting or receiving by the less noisy channels. In other words, precoding technique is a way to enhance signal intensity and to reduce the multipath channel fading. The precoding technique requires channel state information (CSI) associated with reception channel capacity. The channel state information can be obtained by using channel estimation method. For example, it can send pilot symbols for the reception end to estimate the channel state information and send it to a transmission end via a feedback method, and generates the beamforming matrix. Another example is estimating the channel between the transmission end to the reception end by the transmission end according to reverse channel information from the transmission end to the reception end. Based on the MIMO and precoding techniques, the invention provides a selection circuit 200 of multiple input/output ports and antenna sub-arrays for reconfigurable hybrid beamforming. Please refer to FIG. 2, which is a schematic diagram of a selection circuit 200 according to an embodiment of the present invention. The selection circuit 200 includes a plurality of digital signal processing modules, a plurality of analog front end (AFE) and radio frequency (RF) chains 210, a plurality of multiplexing circuits 220 and a plurality of antenna sub-arrays 230.

Each AFE and RF chain 210 is electrically connected to one of the digital signal processing module. Each digital signal processing module is electrically connected to a one of a plurality of input/output ports. Each multiplexing circuit 220 is electrically connected to any number of the AFE and RF chains 210. Each antenna sub-array 230 is electrically connected to one of the multiplexing circuits 220, and the multiplexing circuits 220 can set any number of the antenna sub-arrays 230 to transmit/receive any number of input/output electrical signals of the AFE and RF chains 210.

Wherein each antenna sub-array 230 includes a plurality of phase shifters 231, a plurality of power amplifiers 232 and a plurality of antenna ends 233.

Each phase shifter 231 is electrically connected to one of the multiplexing circuit 231. Each power amplifier 232 is electrically connected to one of the phase shifter 231. Each antenna end 233 is electrically connected to power amplifier 232. Preferably, the antenna sub-arrays have different polarization direction combinations.

Figure 3A:
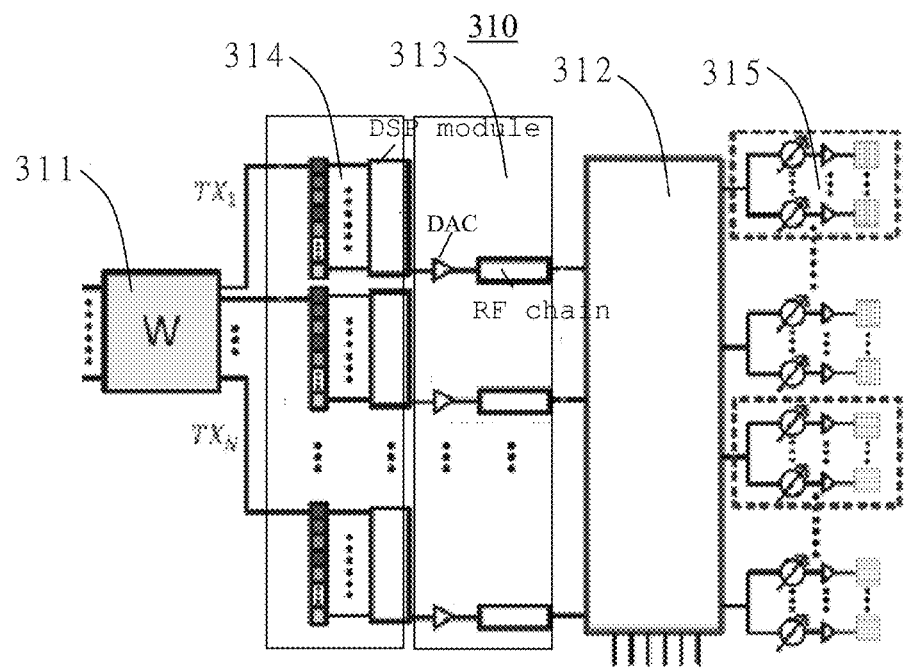
FIGS. 3a and 3b are schematic diagrams of a signal processing and transmission/reception system according to an embodiment of the present invention.
Figure 3B:
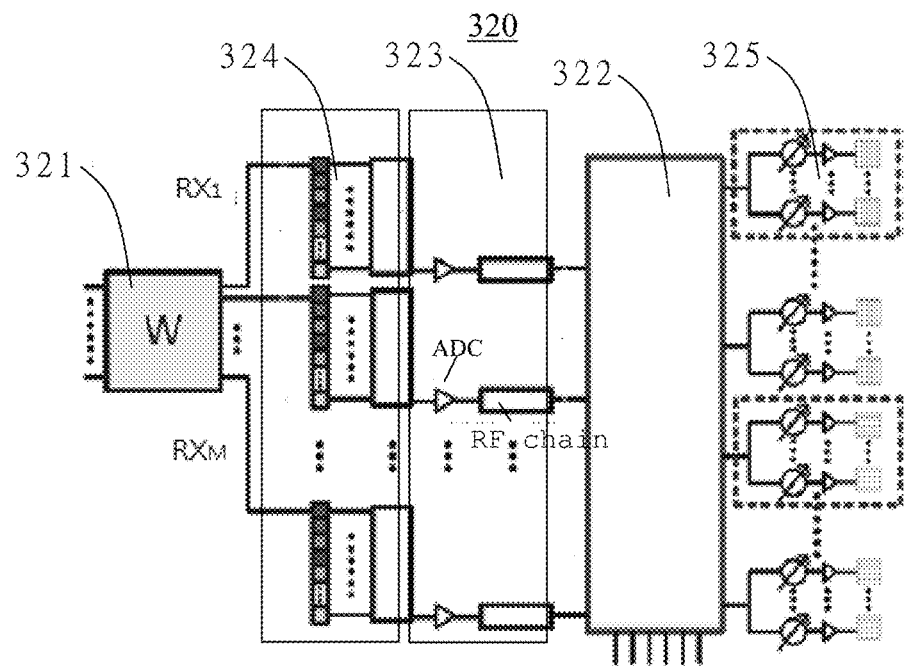

Please refer to FIG. 3a and FIG. 3b, the invention further provides a signal processing and transmission/reception system. The signal processing and transmission/reception system includes a transmission end and a reception end. The transmission end includes a precoder 311 and an above-mentioned first selection circuit 310 of multiple input ports and antenna sub-arrays combination. The precoder 311 is used to encode a data signal by using a signal processing method to output a plurality of first electrical signals.

In the first selection circuit 310, a unit including a plurality of multiplexing circuits 312 can be connected to the corresponding AFE and RF chain 313. The plurality of first electrical signals can be inputted via a digital signal processing (DSP) module 314. An antenna sub-array combination 315 can be arranged by the multiplexing circuits 312 for transmitting a wireless signal.

Similar to the transmission end, the reception end includes an above-mentioned second selection circuit 320 of multiple input ports and antenna sub-arrays, and an equalizer 321.

In the second selection circuit 320, an antenna sub-array combination 325 can be arranged by a unit including a plurality of multiplexing circuits 322 for receiving the wireless signal. The unit including a plurality of multiplexing circuits 322 can be connected to the corresponding AFE and RF chain combination 323. Therefore, a plurality of second electrical signals can be generated by a digital signal processing module 324 and outputted to the equalizer 321. The equalizer 321 is utilized for combing the plurality of second electrical signals by using a signal processing method, and outputting the data signal.

Figure 4A:
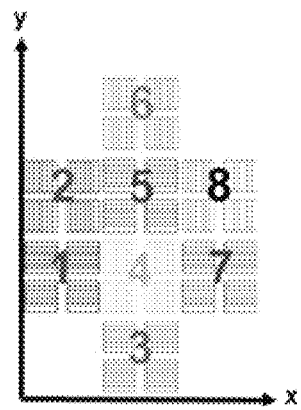
FIG. 4a to FIG. 4c are schematic diagrams of antenna sub-array combination of transmission end according to embodiments of the present invention.
Figure 4B:
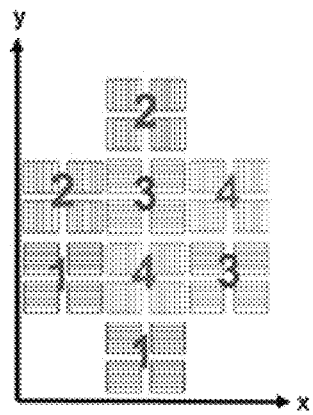
Figure 4C:
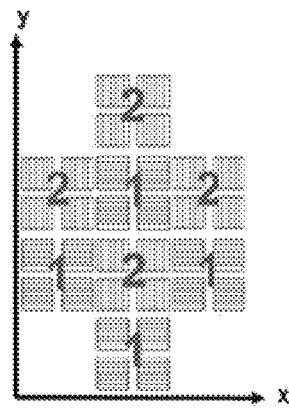

Please refer to FIG. 4*a* to FIG. 4*c*, which show the antenna sub-arrays of the transmission end. In an embodiment, the transmission end has eight antenna sub-arrays. Each number represents an antenna sub-array, the same/different number represents the same/different antenna sub-array combination. As shown in FIG. 4*a*, the eight antenna sub-arrays are arranged to eight antenna sub-array combinations (denoted by 1 to 8) for transmitting a wireless signal. As shown in FIG. 4*b*, every two antenna sub-arrays from one antenna sub-array combination. Therefore, there are four antenna sub-array combinations (denoted by 1 to 4) for transmitting the wireless signal. As shown in FIG. 4*c*, every four antenna sub-arrays from one antenna sub-array combination. Thus, there are two antenna sub-array combinations (denoted by 1 to 2) for transmitting the wireless signal. Each antenna sub-array combination corresponds to a respective AFE and RF chains 210, a respective digital signal processing module, connected input/output ports. And this is not a limitation of the present invention.

Figure 5:
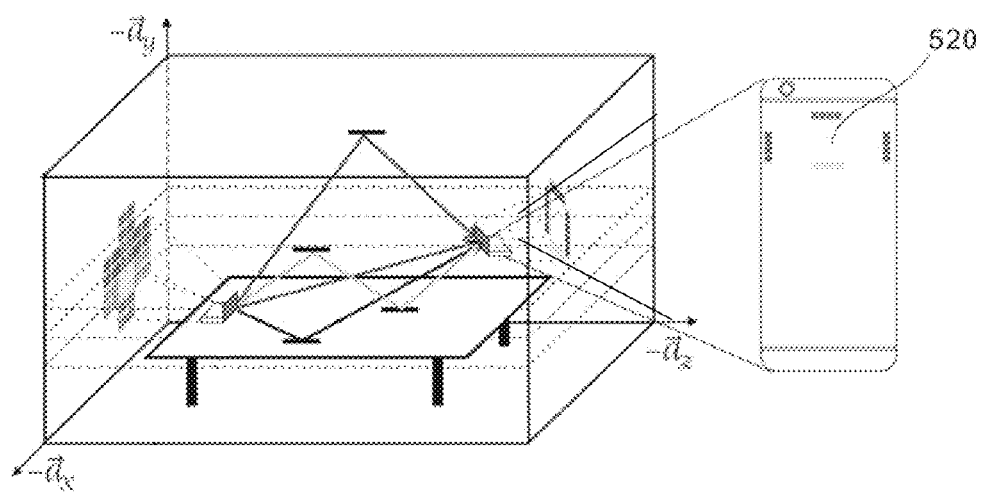
FIG. 5 is a schematic diagram illustrating a wireless transmission environment equipped with a signal transmission/reception system according to an embodiment of the present invention.

Please refer to FIG. 5, which illustrates a wireless transmission environment equipped with a signal transmission/reception system. A transmission end or a reception end 520 can be a mobile device, a computer, an antenna station, etc. The reception end 520 is equipped with a selection circuit of multiple input/output ports and antenna sub-array. In an embodiment, the transmission end has eight antenna sub-arrays and the reception end has four antenna sub-arrays. The combination selection method can arrange various antenna sub-arrays combinations and estimate the link qualities of different channels so as to find the best signal transmission method.

Figure 6:
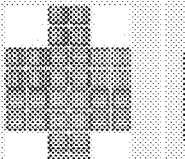
FIG. 6 is a schematic diagram illustrating antenna sub-array combination of transmission end and reception end according to an embodiment of the present invention.

Please refer to FIG. 6, which illustrating antenna sub-array combination of transmission end and reception end according to an embodiment of the present invention. As shown in FIG. 6, various antenna sub-arrays are arranged to form multiple input multiple output modes (MIMO modes) by using the combination selection method of multiple input/output ports and antenna sub-arrays. In the above-mentioned embodiments, if the input end arranges four output antenna sub-array (TX array) combinations. Each antenna sub-array combination corresponds to an AFE and RF chain, a digital signal processing module and connected input ports. And, the reception end arranges four output antenna sub-array (RX array) combinations. Each antenna sub-array combination corresponds to an AFE and RF chain, a digital signal processing module and connected output ports. In such a situation, the multiple input multiple output combination mode can be represented by 4×4 (mode 2).

In another embodiment, if the input end arranges one output antenna sub-array combination, and the reception end arranges two reception antenna sub-array combinations. In such a situation, the multiple input multiple output combination mode can be represented by 1×2 (mode 9). And this is not a limitation of the present invention, The combination selection method of multiple input/output port and antenna sub-array of the present invention can arrange various antenna sub-arrays combinations and estimate the link quality of different channels so as to find the best signal transmission method.

Figure 7A:
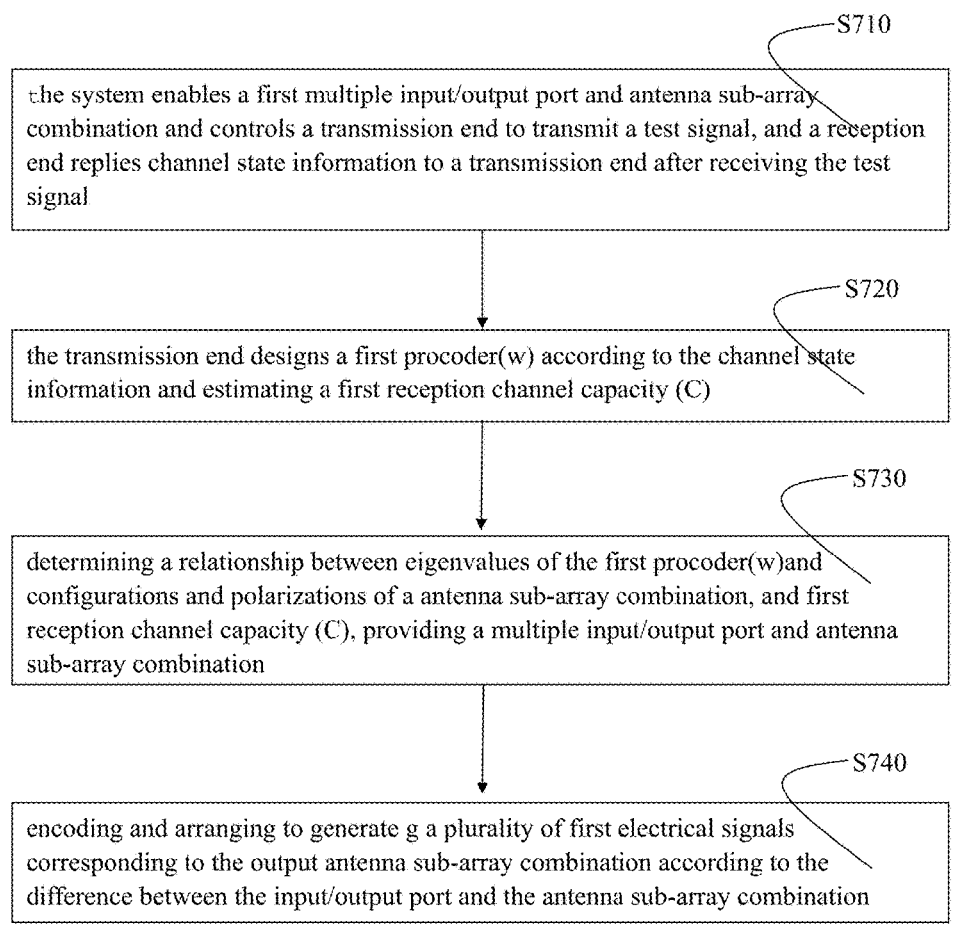
FIG. 7a to FIG. 7c are schematic diagrams illustrating a combination selection method according to embodiments of the present invention.
Figure 7B:
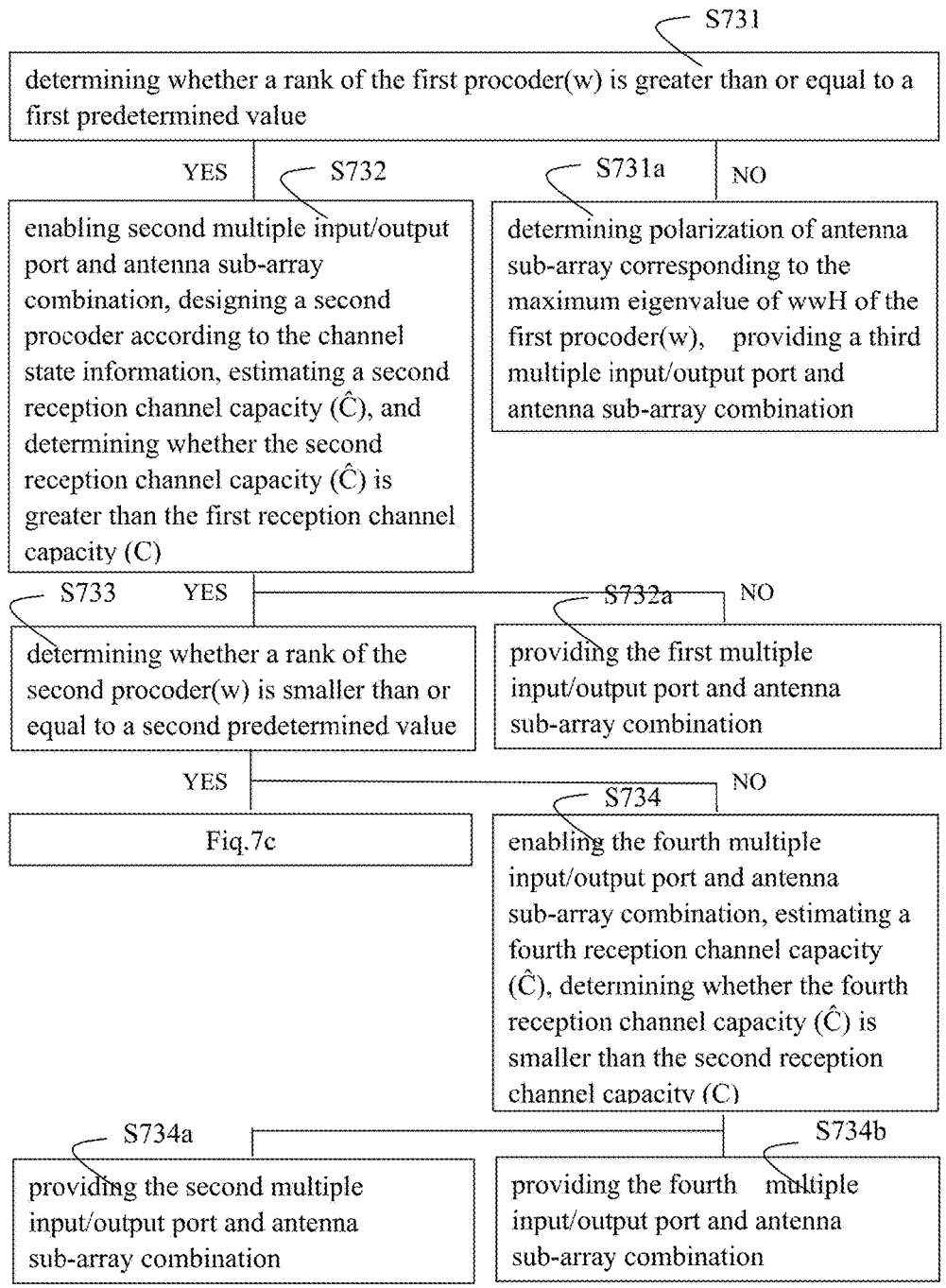
Figure 7C:
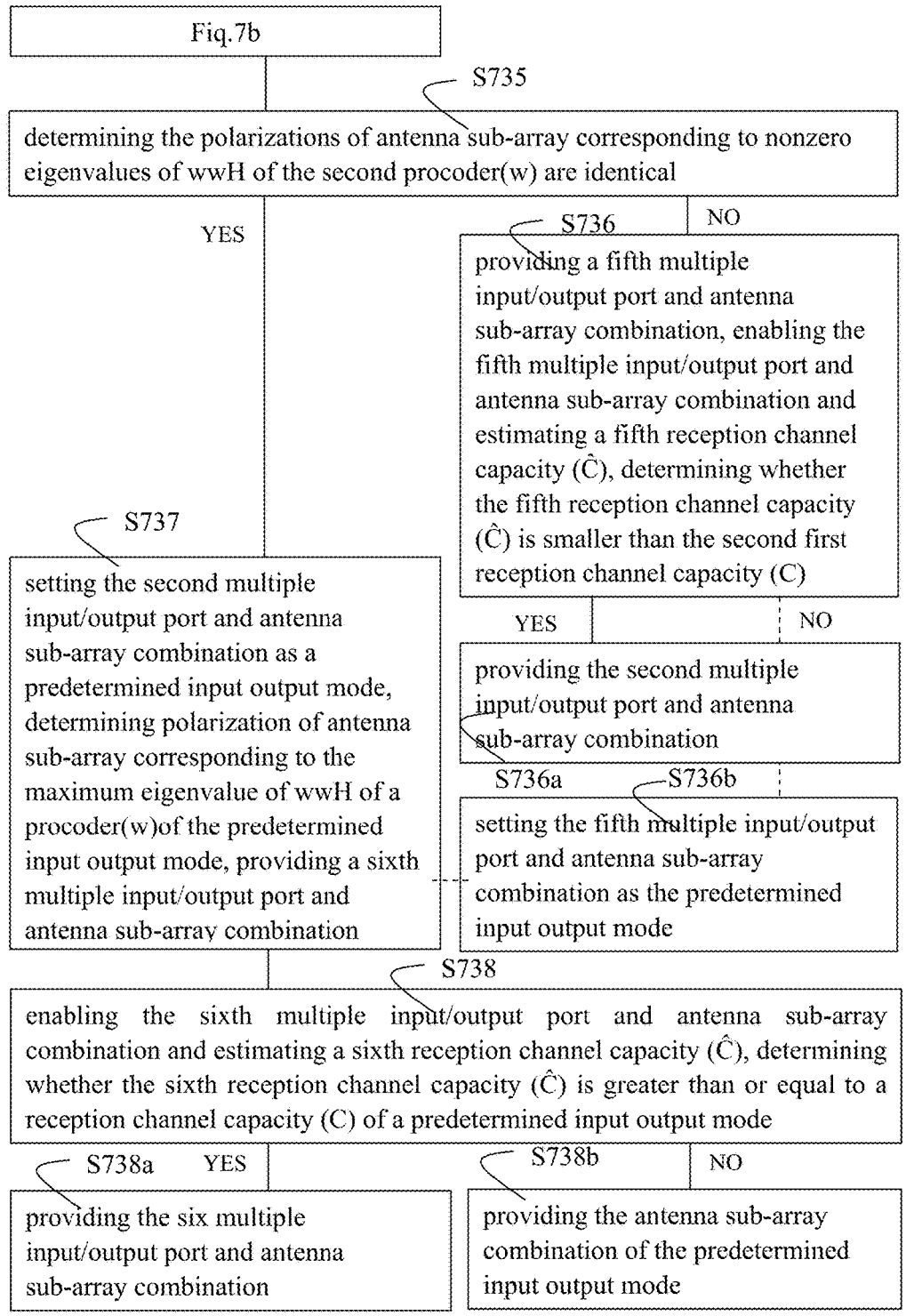

Please refer to FIG. 7*a* to FIG. 7*c*. The invention provides a combination selection method of multiple input/output ports and antenna sub-arrays combination, which is applied in a signal processing and transmission/reception system maintained above. The combination selection method includes the following steps: in FIG. 7*a*, (a) (Step S710) the system enables starts up a first multiple input/output port and antenna sub-array combination and controls a transmission end to transmit a test signal. After receiving the test signal, a reception end replies channel state information (CSI) to the transmission end. The channel state information corresponds to channel statistic information of spatial and frequency generated by the first multiple input/output port and antenna sub-array combination. Preferably, the channel state information includes a statistic value T of channel correlation matrix between multiple input ports of a transmission end in frequency domain, a statistic value R of channel correlation matrix between multiple output ports of a reception end in frequency domain, a statistic value of channel coefficients between multiple input ports of a transmission end and multiple output ports of a reception end in frequency domain, and a signal-to-noise ratio (SNR, $p/\rho w2$).

(b) the transmission end designs a first procoder(w) according to the channel state information and estimating a first reception channel capacity (C) (Step S720). Preferably, the reception channel capacities are averages of channel capacities of respective use channels.

(c) determining a relationship of configurations and polarizations between eigenvalues of the first procoder(w) and configurations and polarizations of the first antenna sub-array combination, and first reception channel capacity (C), providing a multiple input/output port and antenna sub-array combination (Step S730). Preferably, in FIG. 7*b* and FIG. 7*c*, the step (c) further includes the following steps. (c1) determining whether the rank of the first procoder (w) is greater than or equal to a first predetermined value (Step S731). If yes, providing a second multiple input/output port and antenna sub-array combination and performing the step (c2). If no, determining the polarization of the antenna sub-array corresponding to the maximum eigenvalue of the first procoder(w) $ww^H$ providing the third multiple input/output port and antenna sub-array combination, wherein $ww^H$ represents the product of the encoding characteristic matrices (Step S731*a*) and performing the step (d).

(c2) repeating the step (a) and step (b), starting up the second multiple input/output port and antenna sub-array combination, designing a second procoder according to the channel state information, estimating a second reception channel capacity (Ĉ), and determining whether the second reception channel capacity (Ĉ) is greater than the first reception channel capacity (C) (Step S732). If not, providing the first multiple input/output port and antenna sub-array combination (Step S732*a*), and performing the step (d). If yes, further determining whether a rank of the second procoder (w) is smaller than or equal to a second predetermined value (Step S733); if no, determining the polarization of the antenna sub-array corresponding to the maximum eigenvalue of the second procoder(w) ww$^H$ providing the fourth multiple input/output port and antenna sub-array combination and performing the step (c3) (Step S734); if so, performing the step (c4) (Step S735).

(c3) repeating the step (a) and step (b), enabling the fourth multiple input/output port and antenna sub-array combination, estimating a fourth reception channel capacity ($\hat{C}$), determining whether the fourth reception channel capacity ($\hat{C}$) is smaller than the second reception channel capacity (C); if yes, providing the second multiple input/output port and antenna sub-array combination (Step S734a) and performing the step (d); if no, providing the fourth multiple input/output port and antenna sub-array combination (Step S734b) and performing the step (d).

(c4) determining whether the polarizations of the antenna sub-array corresponding to nonzero eigenvalues of wwH of the second procoder(w) are identical (Step S735); if no, providing a fifth multiple input/output port and antenna sub-array combination and performing the step (c5) (Step S736); if yes, setting the second multiple input/output port and antenna sub-array combination as a predetermined input output mode and performing the step (c6) (Step S737).

(c5) repeating the step (a) and step (b), enabling the fifth multiple input/output port and antenna sub-array combination and estimating a fifth reception channel capacity ($\hat{C}$), determining whether the fifth reception channel capacity ($\hat{C}$) is smaller than the second reception channel capacity (C); if so, providing the second multiple input/output port and antenna sub-array combination (Step S736a) and performing the step (d); if not, setting the fifth multiple input/output port and antenna sub-array combination as a predetermined input output mode (Step S736b) and performing the step (c6) to design a fifth procoder.

(c6) determining the polarization of the antenna sub-array corresponding to the maximum eigenvalue of the procoder (w) ww$^H$ of a predetermined input output mode, providing a sixth multiple input/output port and antenna sub-array combination (Step S737a) and performing the step (c7).

(c7) repeating the step (a) and step (b), starting up the sixth multiple input/output port and antenna sub-array combination and estimating a sixth reception channel capacity ($\hat{C}$), determining whether the sixth reception channel capacity ($\hat{C}$) is greater than or equal to the reception channel capacity (C) of predetermined input output mode (Step S738); if yes, providing the six multiple input/output port and antenna sub-array combination (Step S738a) and performing the step (d); if no, providing the antenna sub-array combination of predetermined input output mode (Step S738b) and performing the step (d).

(d) generating a plurality of first electrical signals corresponding to the output antenna sub-array combination by encoding and arranging according to the provided multiple input/output port and the antenna sub-array combination (Step S740).

Figure 8:
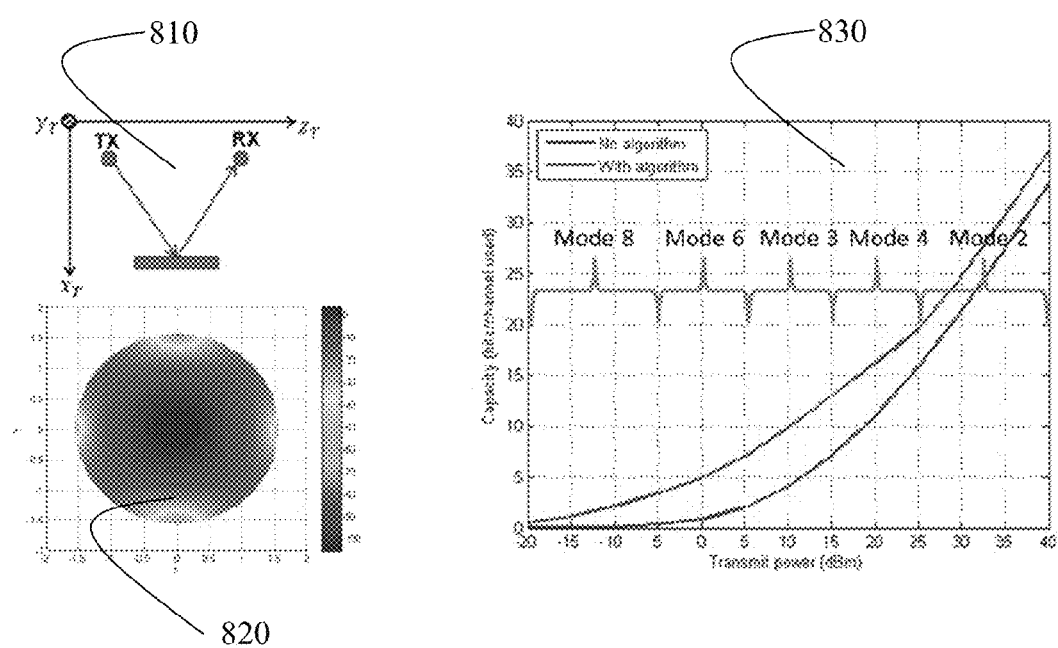
FIG. 8 is a schematic diagram of a channel capacity versus the transmit power of a first wireless transmission environment according to embodiments of the present invention.

Please refer to FIG. 8, which is a schematic diagram illustrating a channel capacity versus the selection transmission power of in a first wireless transmission environment. Referring to the section 810 shown in the upper left of FIG. 8, the transmission end and the reception end are located in the same horizontal plane in FIG. 5. A beam is emitted by the output antenna sub-array and reflected once by the wall. After being reflected once by a wall, the beam reaches the receiving antenna sub-array. In such a situation, the x-polarized antenna has a larger antenna gain than the y-polarized antenna in the reflection path. Referring to the section 820 shown in the bottom left of FIG. 8 and the section 920 shown in the bottom left of FIG. 9, the section 820 shows a cylindrical coordinate diagram of the electric field intensity of the respective x-polarized antenna, and the section 920 shows a cylindrical coordinate diagram of the electric field intensity of the respective y-polarized antenna. In comparison, there is a better beam width of antenna in the x direction shown in the section 820 of FIG. 8, since the antenna current is driven along the x direction and both of the transmission end and the reception end are located in the same horizontal plane of FIG. 5, and the signal is mainly transmitted via reflection in the x direction.

Furthermore, comparing the signal transmission power of different multiple input multiple output modes, please further refer to FIG. 8. Referring to the section 830 shown in the right hand side of FIG. 8, when the noise ratio of signal is extremely low, the channel selection method chooses the mode 8 to arrange input/output port and the antenna sub-array combination for maximizing the antenna sub-array and optimizing the channel capacity.

If the signal to noise ratio gradually increases, the channel selection method chooses the mode 6 to arrange the input/output port and the antenna sub-array combination, so as to exploit the spatial diversity for capacity enhancement. In such a situation, although the array gain of each antenna is reduced by half, the increased spatial diversity improves the channel capacity.

If the signal to noise ratio continues to increase, the system chooses the mode 3 to arrange the input/output port and the antenna sub-array combination. As shown in the section 920 of FIG. 9, although the beam width of the vertically polarized (y-polarized) antenna is narrower than the beam width of the horizontally polarized (x-polarized) antenna, there is a higher orthogonality relationship between the horizontal polarization radiation pattern and the vertical polarization radiation pattern, and the correlation of the channel coefficient between each other may be lower, it is better than the channel coefficient of two antenna sub-arrays having the same polarization in the mode 6. Moreover, the corresponding antenna sub-arrays have higher array gain. Therefore, the mode 3 configuration brings higher channel capacity.

If the signal to noise ratio further increases, the system chooses the mode 4 configuration to use four antenna sub-arrays for the arrangement of the input/output port and the antenna sub-array combination, so as to exploit the spatial diversity for capacity enhancement. Similarly, if the noise ratio of signal further increases, the system chooses the mode 2 configuration to arrange of the input/output port and the antenna sub-array combination, so as to exploit the spatial diversity for capacity enhancement.

Compared to the conventional hybrid beamforming using eight antenna sub-arrays, the transmission rate of the reconfigurable hybrid beamforming of the invention can be increased by 500%-35% (e.g., the transmission rate may reach 5-25 (bit/sec/channel)) when the output power is between 0 dBm-30 dBm. On the other hand, when the transmission rate is between 2-32 (bit/sec/channel), the reconfigurable hybrid beamforming of the invention has 15 dB-3 dB gain greater than the conventional hybrid beamforming using eight antenna sub-arrays.

Figure 9:
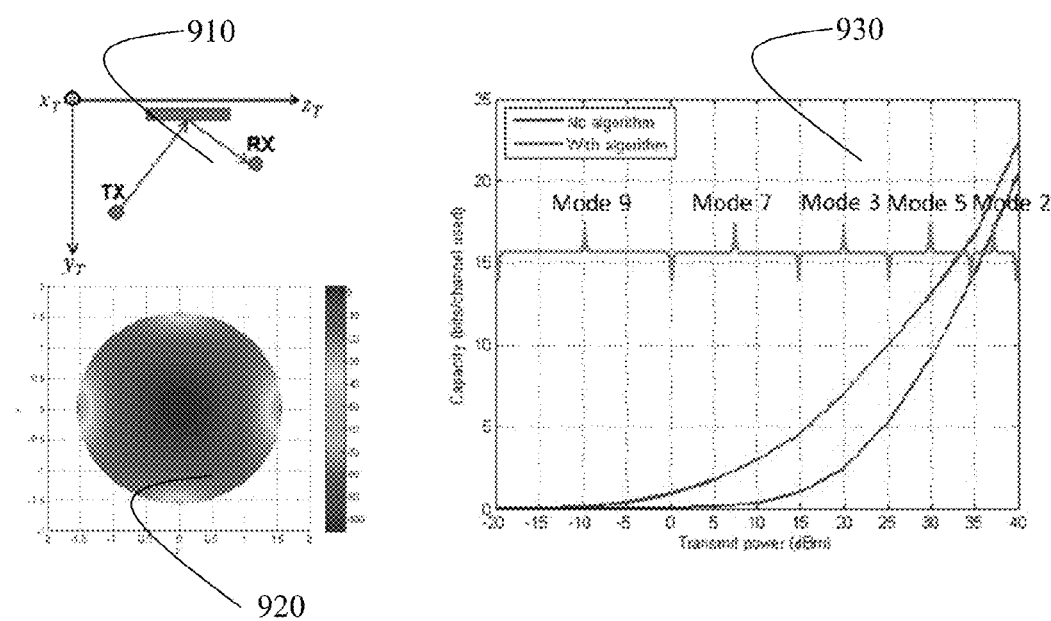
FIG. 9 is a schematic diagram of a channel capacity versus the transmit power of a second wireless transmission environment according to embodiments of the present invention.

Please refer to FIG. 9, which is a schematic diagram illustrating a channel capacity versus the transmission power of a second wireless transmission environment. Referring to the section 910 shown in the upper left of FIG. 9, the transmission end and the reception end are located in the same vertical planes. A beam is emitted by the output antenna sub-array and reflected once in FIG. 5. The beam reaches the receiving antenna sub-array after being reflected once in FIG. 5. In such a situation, the y-polarized antenna has a larger antenna gain than the x-polarized antenna in the reflection path. Referring to the section 920 shown in the bottom left of FIG. 9 and the section 820 shown in the bottom left of FIG. 8, the section 920 shows a cylindrical coordinate diagram of the electric field intensity of respective y-polarized antenna and the section 820 shows a cylindrical coordinate diagram of the electric field intensity of respective x-polarized antenna. In comparison, there is a better beam width of antenna in the y direction shown in the section 920 of FIG. 9 since the antenna current is driven along the y direction and both of the transmission end and the reception end are located in the same vertical plane, and the signal is mainly transmitted via reflection in the y direction.

Furthermore, comparing the signal transmission power of different multiple input multiple output modes, please further refer to FIG. 9. Referring to the section 930 shown in the right side of FIG. 9, when the noise ratio of signal is extremely low, the channel selection method chooses the mode 9 to arrange the input/output port and antenna sub-array combination for maximizing the antenna sub-array gain and optimizing the channel capacity.

Similar to the operation in the first wireless transmission environment, when the signal to noise ratio gradually increases, the channel selection method chooses the mode 7, the mode 3 and the mode 5 in sequence to arrange the input/output port and antenna sub-array combination for the channel capacity optimization. Comparing to the conventional hybrid beamforming using eight antenna sub-arrays, the transmission rate of the reconfigurable hybrid beamforming of the invention can be increased by 500%-44% (e.g., the transmission rate may reach 1-13 (bit/sec/channel)) when the output power is between 0 dBm-30 dBm. On the other hand, when the transmission rate is between 2-26 bit/sec/channel, the reconfigurable hybrid beamforming of the invention has 12 dB-3 dB gain greater than the conventional hybrid beamforming using eight antenna sub-arrays.

According to the simulation results of the FIG. 8 and FIG. 9, the invention can estimate channel situation and arrange the number and polarization of antenna sub-arrays corresponding to multiple input/output ports via a learning and configuration selection method. In the low signal to noise ratio situation, the selection circuit can effectively increase the channel capacity with array gains, in the high signal to noise ratio situation, the selection circuit can effectively increase the channel capacity with array gains, spatial diversity and polarization diversity, as well as the system by using power allocation and precoding technique.

Although the present disclosure has been described in considerable detail with reference of embodiments maintained, other embodiments are still possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A signal processing and transmission/reception system, comprising:
 a transmission end, comprising:
  a precoder, for encoding a data signal by using a signal processing method to output a plurality of first electrical signals relating to an antenna sub-array combination, wherein the antenna sub-array combination is with a plurality of polarization direction combinations; and
  a first selection circuit of multiple input ports and antenna sub-arrays combination, comprising:
   an input port;
   a plurality of first digital signal processing modules, each is electrically connected to the precoder through the input port;
   a first analog front end (AFE) and radio frequency (RF) chain, each is electrically connected to one of the first digital signal processing modules, wherein each of the first digital signal processing modules and each of the AFE and RF chain form a plurality of first chain lines turned on according to the first electrical signals;
   a plurality of first multiplexing circuits, each is electrically connected to the first AFE and RF chain according to the first electrical signals; and
   a plurality of first antenna sub-arrays, each is electrically connected to one of the first multiplexing circuits, the first antenna sub-arrays is set by the number of first chains turned on and the number of first multiplexing circuits connected to form the antenna sub-array combination, and transmitting a wireless signal, comprising:
    a plurality of first phase shifters;
    a plurality of first power amplifiers; and
    a plurality of first antenna ends;
 a reception end, comprising:
  a second selection circuit of multiple output ports and antenna sub-arrays combination, comprising:
   a plurality of second antenna sub-arrays, for receiving the wireless signal to form the antenna sub-array combination by a number of second chains turned on and a number of second multiplexing circuits connected, and generating a plurality of second electrical signals, comprising:
    a plurality of second antenna ends;
    a plurality of second power amplifiers; and
    a plurality of second phase shifters;
   the second multiplexing circuits, each is electrically connected to one of the second antenna sub-arrays;
   a second AFE and RF chain, each is electrically connected to any number of the second multiplexing circuits, according to the wireless signal;
   a plurality of second digital signal processing modules, each is electrically connected to the second AFE and RF chain, wherein each of the second digital signal processing modules and each of the second AFE and RF chain form the second chain lines turned on according to the wireless signal; and
   an output port; and
  an equalizer, which is electrically connected to the second digital signal processing modules through the output port, for combing the plurality of second electrical signals by using the signal processing method, and outputting the data signal.

2. A device of a signal processing and transmission system, comprising:

a precoder, for encoding a data signal by using a signal processing method to output a plurality of electrical signals relating to an antenna sub-array combination, wherein the antenna sub-array combination is with a plurality of polarization direction combinations; and a selection circuit of multiple input ports and antenna sub-arrays combination, comprising:
an input port;
a plurality of digital signal processing modules, each is electrically connected to the precoder through the input port;
an analog front end (AFE) and radio frequency (RF) chain, each is electrically connected to one of the digital signal processing modules, wherein each of the digital signal processing modules and each of the AFE and RF chain form a plurality of chain lines turned on according to the electrical signals;
a plurality of multiplexing circuits, each is electrically connected to of the AFE and RF chain according to the electrical signals; and
a plurality of antenna sub-arrays, each is electrically connected to one of the multiplexing circuits, the antenna sub-arrays is set by the number of chains turned on and the number of multiplexing circuits connected to form the antenna sub-array combination, and transmitting a wireless signal, comprising:
a plurality of phase shifters;
a plurality of power amplifiers; and
a plurality of antenna ends.

3. A selection method of multiple input/output ports and antenna sub-arrays combination, is applied in a device of a signal processing and transmission system as claim 2, the method comprising:
(a) the system starts up a first multiple input/output port and antenna sub-array combination, and transmitting a test signal via a transmission end, a reception end replies a channel state information (CSI) to the transmission end after receiving the test signal, wherein the channel state information corresponds to channel statistic information of spatial and frequency generated by the first multiple input/output port and antenna sub-array combination;
(b) the transmission end designs a first procoder (w) according to the channel state information, and estimating a first reception channel capacity (C);
(c) determining a relationship of configurations and polarizations whether a rank of the first procoder (w) is greater than or equal to a first predetermined value of the first antenna sub-array combination, if no, determining the polarization of the antenna sub-array corresponding to the maximum eigenvalue of the first procoder (w) $ww^H$, if yes, repeating the step (a) and step (b), starting up another one of the multiple input/output port and antenna sub-array combination, designing a second procoder according to the channel state information, then estimating a second reception channel capacity ($\hat{C}$) and the first reception channel capacity (C), providing a multiple input/output port and antenna sub-array combination; and
(d) generating a plurality of first electrical signals corresponding to the antenna sub-array combination by encoding and arranging according to the provided multiple input/output port and the antenna sub-array combination.

4. The selection method of claim 3, wherein the step (c) further comprises:

(c1) determining whether a rank of the first procoder (w) is greater than or equal to a first predetermined value, if yes, providing a second multiple input/output port and antenna sub-array combination, and performing the step (c2), if no, determining the polarization of the antenna sub-array corresponding to the maximum eigenvalue of the first procoder (w) $ww^H$, providing a third multiple input/output port and antenna sub-array combination, and performing the step (d);

(c2) repeating the step (a) and step (b), starting up the second multiple input/output port and antenna sub-array combination, designing a second procoder according to the channel state information, and estimating a second reception channel capacity ($\hat{C}$), determining whether the second reception channel capacity ($\hat{C}$) is greater than the first reception channel capacity (C), if no, providing the first multiple input/output port and antenna sub-array combination, and performing the step (d), if yes, further determining whether the rank of the second procoder (w) is smaller than or equal to a second predetermined value, if no, determining the polarization of the antenna sub-array corresponding to the maximum eigenvalue of the second procoder (w) $ww^H$, providing a fourth multiple input/output port and antenna sub-array combination, and performing the step (c3), if yes, performing the step (c4);

(c3) repeating the step (a) and step (b), starting up the fourth multiple input/output port and antenna sub-array combination, estimating a fourth reception channel capacity ($\hat{C}$), determining whether the fourth reception channel capacity ($\hat{C}$) is smaller than the second reception channel capacity (C), if yes, providing the second multiple input/output port and antenna sub-array combination, and performing the step (d), if no, providing the fourth multiple input/output port and antenna sub-array combination, and performing the step (d);

(c4) determining whether polarizations of the antenna sub-arrays corresponding to nonzero eigenvalues of the second procoder (w) $ww^H$ are identical, if no, providing a fifth multiple input/output port and antenna sub-array combination, and performing the step (c5), if yes, setting the second multiple input/output port and antenna sub-array combination as a predetermined input/output mode, and perfoiiuing the step (c6);

(c5) repeating the step (a) and step (b), starting up the fifth multiple input/output port and antenna sub-array combination, and estimating a fifth reception channel capacity ($\hat{C}$), determining whether the fifth reception channel capacity ($\hat{C}$) is smaller than the second first reception channel capacity (C), if yes, providing the second multiple input/output port and antenna sub-array combination, and performing the step (d), if no, setting the fifth multiple input/output port and antenna sub-array combination as the predetermined input/output mode, and performing the step (c6) to design a fifth procoder; and (c6) determining the polarization of the antenna sub-array corresponding to the maximum eigenvalue of a procoder (w) $ww^H$ of predetermined input/output mode, providing a sixth multiple input/output port and antenna sub-array combination, and performing the step (c7); and (c7) repeating the step (a) and step (b), starting up the sixth multiple input/output port and antenna sub-array combination, and estimating a sixth reception channel capacity ($\hat{C}$), determining whether the sixth reception channel capacity ($\hat{C}$) is greater than or equal to a reception channel capacity (C) of predetermined input/output mode, if yes, providing the six multiple input/output port and antenna sub-array combination, and performing the step (d), if no, providing the antenna sub-array combination of predetermined input/output mode, and performing the step (d).

5. The combination selection method of claim 3, wherein the channel state information comprises a statistic value T of channel correlation matrix between multiple input ports of the transmission end in a frequency domain, a statistic value R of channel correlation matrix between multiple output ports of a reception end in the frequency domain, a statistic value of channel coefficients between the multiple input ports of the transmission end and the multiple output ports of a reception end in the frequency domain, and a signal-to-noise ratio (SNR).

6. The combination selection method of claim 5, wherein the reception channel capacities are the averages of channel capacities of respective used channels.

7. A device of a signal processing and reception system, comprising:
  a selection circuit of multiple output ports and antenna sub-arrays combination, comprising:
    a plurality of antenna sub-arrays, for receiving a wireless signal to form the antenna sub-array combination by a number of chains turned on and a number of multiplexing circuits connected, and generating a plurality of electrical signals, comprising:
      a plurality of antenna ends;
      a plurality of power amplifiers; and
      a plurality of phase shifters;
    the multiplexing circuits, each is electrically connected to one of the antenna sub-arrays;
    an AFE and RF chain, each is electrically connected to any number of the multiplexing circuits, according to the wireless signal;
    a plurality of digital signal processing modules, each is electrically connected to the AFE and RF chain, wherein each of the digital signal processing modules and each of the AFE and RF chain form the chain lines turned on according to the wireless signal; and
    an output port; and
    an equalizer, which is electrically connected to the digital signal processing modules through the output port, for combing the electrical signals by using the signal processing method, and outputting the data signal.

* * * * *